Patented Jan. 15, 1929.

1,698,806

UNITED STATES PATENT OFFICE.

ANDREW THOMA, OF CAMBRIDGE, MASSACHUSETTS, ASSIGNOR, BY MESNE ASSIGNMENTS, TO NORTH AMERICAN CHEMICAL COMPANY, OF BOSTON, MASSACHUSETTS, A CORPORATION OF MASSACHUSETTS.

SHOE-BOTTOM FILLER.

No Drawing.   Application filed October 23, 1924.   Serial No. 745,517.

In my Patent No. 1,138,910 I have elaborated and broadly claimed a shoe-bottom filler in which, considered broadly, the filler at the time of use is sleek, slippery or slimy throughout its mass so that the operator may work at high speed without undue fatigue. The present invention is an improvement on this general type of filler. I introduce the slippery producer in the form of a dry powder which remains inert, or inactive, or without functioning until the filler is used. It is then fluidified which renders it slimy or slippery to function as set forth in the aforesaid patent. In my patent aforesaid I mention a large variety of slippery components or slime producers which however as there contemplated are used in solution. According to my present invention these components are used in the form of a dry powder. For commercial purposes it is essential that the filler be practically unchangeable until ready for use. To meet the modern requirements of economical manufacture in large quantities so that the filler may be stored and shipped in a practical commercial way and after shipment may be held in shoe factories as long as the conditions of trade may require before use and then be ready for instant use without adding any further ingredients or treating it in any way excepting by the regular commercial filling machines, I have combined with my well-known, quick-setting, low-melting, normally-sticky, pliable, resilient and non-shifting filler a component of the kind mentioned in dry or powdered form, this being preferably a saponifying agent. Also this is preferably used in connection with dry corn starch or any of the stiffening and restraining agents in powdered form as mentioned in my Patent No. 1,032,312. Such a filler is capable of holding its condition unchanged indefinitely and yet when steamed or used with suitable moisture and heat the slimy, sleek, slippery element instantly asserts itself to an extent which prevents the filler from smearing and permanently injuring the welt when accidentally brought into contact therewith, and said slippery element so intimately and thoroughly permeating the filler as to hold its condition proper for rapid spreading in the shoe for a long period in the heating and steaming pan or filling machine without appreciable deterioration, and finally when used in the preferred form of a saponifying agent or alkali in connection with the starches of my patent last mentioned above the filler is extremely light in weight. The saponifying agent or alkali which I prefer is soda ash or the cheap form of soda carbonate. This is admixed in a very small proportion and as a dry powder. When starch is used the two powders are admixed intimately before they are added to the ground cork or other body material and the wax tailings or other binder and are thus intimately disseminated through the mass in close physical proximity. For the best results the wax tailings or other binder and the cork are first thoroughly mixed so that the cork granules are thinly but thoroughly coated with the hot binder, and then the previously mixed dry starch and dry soda ash are thoroughly mixed in the said coated cork, the result being that the powder permeates the mass but is not directly on the cork as a coating next to the cork because the wax tailings or binder coats the cork and keeps said powder from direct contact with the cork. Hence when later rendered active by the steam or hot moisture process, the slimy, slippery element or elements are more readily active as surface elements in the laying of the filler. The object of this is to maintain the cork as sticky and as adhesive to the leather as possible while yet giving the filler mass a slippery surface with reference to the filler laying knife or tool in the hand of the operator. A filler containing the combination of dry powders admixed as stated is exceedingly speedy or quick to use and to be brought by the steam to a condition for use. The steam seems to have more ready and quicker access and penetration in such a filler. While the exact proportions are not necessarily fixed and definite, a proper degree of sliminess and slipperiness in the last mentioned form of filler is secured by introducing, in powdered condition, two pounds of soda ash to twelve pounds of corn starch in a batch of two hundred and forty pounds of filler. Preferably the starch is subordinate to the wax tailings. The result is that the subsequent steaming of the filler (for instance according to the process or art set forth in my Patents 1,227,502 and 1,118,161) in such a machine for instance as that of Patent 1,225,372 or 1,512,229 or 1,523,701 when thus compounded makes the filler extremely slippery with a soapy surface which I find prevents its smearing or sticking to the welt. And also the two powders which up to the moment of steaming have had no effect whatever upon each other, are mutually beneficial, uniting to produce the extreme sliminess, while the alkali expands the starch increasing the bulk of the filler and producing a permanent lightness which is desirable. The moisture of the steaming process is carried in among the globules of wax tailings and is rendered soapy by the soda ash and this soapy condition of the moisture acting like a coating in among the wax tailings gives the results just mentioned notwithstanding that the same waxy, pitchy binder is used as in my original filler of Patent 861,555. While this soapy condition of the binder remains active I find the filler can, not only be spread more easily, but does not adhere to or smear the welt, but can be readily brushed off. This smearing of the welt has been a very serious and persistent objection to the hot type of filler throughout the years of its extensive use. So that I consider this feature of improvement in the present filler of great value. The soapy condition of the moisture acts like a coating, especially when in combination with the well expanded starch, in among the globules of wax tailings or rather in among the thin binder-covered granules of cork, which gives to the mass a pervasive, slippery, loosely-working character so that the mass can be spread more easily, does not permanently smear the welt and is sufficiently enduring in the heating machine to last long enough for the filling operation. By the latter point I mean that the slippery conditions is so pervasive and of such a character that it is not evaporated or eliminated by the heat during the relatively short time it necessarily remains in the filling and heating machine. If originally introduced in the filler in the form of pasts or solutions the slippery component or components would be gradually evaporating and affecting each other and the filler mass so as probably not to be effective at the time of use. It is possible, however, (and therefore herein mentioned and included in certain of the broader claims) to use the alkali in liquid form when alone or without the starch or stiffening element, in which case it would be used as a saponifying agent to act upon any saponifiable matter or component. Any vegetable oils or compounds and some mineral oils or compounds as mentioned in my patents aforesaid would cooperate thus. Also as I have already pointed out I do not in all cases restrict myself to the combination with a stiffening or restraining component but intend to cover by my claims hereinafter the use of soda ash or other saponifying agent in the filler without being combined with said stiffening component or restrainer as it is beneficial when used alone for producing a slippery condition with the wax tailings or other form of binder. In this case the water or moisture is the vehicle which carries the soapy or slippery condition with the pervasive effect throughout the filler intimately as explained. This water or steam is so very slight in volume that it leaves the total volume of the filler practically unchanged. In other words when set in the shoe-bottom the quantity or layer is the same as before. That is to say my filler made in the limited proportions and slight use of alkali or soda ash as above explained is non-shrinking. It is most expedient that the shoe remain level as filled. One principal reason that some of the cheaper fillers on the market have not met with marked success is because they gradually collapse or shrink and ultimately leave the shoe cavity only partially filled so that the sole gutters, wears uneven, or imparts improper support to the foot. In the preferred embodiment of my present invention the slime producer is always subordinate or in other words the sticky binder is predominant, as distinguished from the various preceding species of slippery fillers in which the slipperiness or slippery producer was predominant. Also in my preferred filler the binder is neutral, i. e., is not influenced by the alkali. This, coupled with the non-shrinking character of the filler, gives great permanence and dependability in the shoe.

My invention is further defined and set forth in the following claims:

1. As an article of manufacture, a shoe-bottom filler of the kind described, comprising a comminuted body material, the granules of which are coated with a binder, combined with a sleeking material adapted to impart to the filler mass a slippery surface and loose working character under the conditions of application to a shoe-bottom cavity, said sleeking material being admixed throughout the mass of coated granules on the surface of the coatings but precluded from direct contact with the body material granules by the binder coatings.

2. As an article of manufacture, a shoe-bottom filler of the kind described, comprising a comminuted body material, the granules of which are coated with a binder, combined with a sleeking material which is normally dormant and inert in the filler but capable of being made active to impart to the filler a slippery surface and loose working character under the conditions of application to a shoe-bottom cavity, said sleeking material being admixed throughout the mass of coated granules on the surface of the coatings but precluded from direct contact with the body material granules by the binder coatings.

3. As an article of manufacture, a shoe-bottom filler of the kind described, comprising a comminuted body material, the granules of which are coated with a binder, combined with a sleeking material in the form of a powder which is normally dormant and inert in the filler but capable of being made active to impart to the filler a slippery surface and loose working character under the conditions of application to a shoe-bottom cavity, said powder being admixed throughout the mass of coated granules on the surface of the coatings but precluded from direct contact with the body material granules by the binder coatings.

4. As an article of manufacture, a shoe-bottom filler of the kind described, comprising a comminuted body material, the granules of which are coated with a binder, combined with a sleeking material in the form of a dry powder which is normally dormant and inert in the filler but capable in the presence of moisture of being made active to impart to the filler a slippery surface and loose working character, said dry powder being admixed throughout the mass of coated granules on the surface of the coatings but precluded from direct contact with the body material granules by the binder coatings.

5. As an article of manufacture, a shoe-bottom filler of the kind described, comprising a comminuted body material, the granules of which are coated with a binder, combined with a sleeking material comprising a saponifying agent, adapted to impart to the filler mass a slippery surface and loose working character under the conditions of application to a shoe-bottom cavity, said sleeking material being admixed throughout the mass of coated granules on the surface of the coatings but precluded from direct contact with the body material granules by the binder coatings.

6. As an article of manufacture, a shoe-bottom filler of the kind described, comprising a comminuted body material, the granules of which are coated with a binder, combined with a sleeking material comprising a saponifying agent, mixed with a stiffening and restraining agent, both in the form of powder and normally dormant and inert in the filler but capable of uniting in the presence of moisture and of becoming active to impart to the filler a slippery surface and loose working character, said powders being admixed throughout the mass of coated granules on the surface of the coating, but precluded from direct contact with the body material granules by the binder coatings.

7. The herein described process of making shoe filler consisting of intermixing starch and a sleeking constituent both in the form of powders, intermixing granulated material and sticky binder, and then intermixing the powder mixture aforesaid with the second mixture aforesaid.

8. As an article of manufacture, a shoe-bottom filler of the kind described, comprising a comminuted body material, the granules of which are coated with a binder, combined with a sleeking material comprising a soluble alkali or alkali carbonate in the form of a dry powder, said powder being admixed throughout the mass of coated granules, on the surface of the coatings but precluded from direct contact with the body material granules by the binder coatings.

9. As an article of manufacture a shoe-bottom filler of the kind described, comprising a comminuted body material, the granules of which are coated with a binder of wax tailings, combined with a sleeking material comprising a soluble alkali or alkali carbonate mixed with a stiffening and restraining agent, both in the form of powder and normally dormant and inert in the filler but capable of uniting in the presence of moisture and of becoming active to impart to the filler a slippery surface and loose working character, said powders being admixed throughout the mass of coated granules on the surface of the coating, but precluded from direct contact with the body material granules by the binder coatings.

10. As an article of manufacture, a shoe-bottom filler of the kind described, comprising a comminuted body material, the granules of which are coated with a binder of wax tailings, combined with a sleeking material comprising soda ash mixed with starch, both in the form of powder and normally dormant and inert in the filler but capable of uniting in the presence of moisture and of becoming active to impart to the filler a slippery surface and loose working character, said powders being admixed throughout the mass of coated granules on the surface of the coating, but precluded from direct contact with the body material granules by the binder coatings.

11. As an article of manufacture, a shoe-bottom filler of the kind described, comprising a lump or mass of comminuted granular material, the granules of which are individually coated with a binder, and a sleeking material, in powdered condition, forming a matrix surrounding and embedding the individual, binder coated granules.

12. As an article of manufacture, a shoe-bottom filler of the kind described, comprising a lump or mass of comminuted granular material, the granules of which are individually coated with a binder, and a sleeking material, in powdered condition, forming a substantially continuous matrix surrounding and embedding the individual, binder coated granules.

13. As an article of manufacture, a shoe-bottom filler of the kind described, comprising a lump or mass of comminuted granular material, the granules of which are individually coated with a binder, and a sleeking material, in powdered condition, forming a matrix surrounding and embedding the individual, binder coated granules and presenting a system previous channels throughout the mass.

14. As an article of manufacture, a shoe-bottom filler of the kind described, comprising a lump or mass of comminuted granular material, the granules of which are individually coated with a binder, and a sleeking material, in powdered condition, forming a matrix surrounding and embedding the individual, binder coated granules, presenting a system of pervious channels throughout the mass, and manifesting water absorption characteristics.

15. As an article of manufacture, a shoe-bottom filler of the kind described, comprising a lump or mass of comminuted granular material, the granules of which are individually coated with a binder, and a sleeking material consisting of soda ash and starch, in powdered condition, forming a matrix surrounding and embedding the individual, binder coated granules.

In testimony whereof, I have signed my name to this specification.

ANDREW THOMA.